US006715042B1

(12) United States Patent
Mirza et al.

(10) Patent No.: US 6,715,042 B1
(45) Date of Patent: Mar. 30, 2004

(54) SYSTEMS AND METHODS FOR MULTIPORT MEMORY ACCESS IN A MULTIMASTER ENVIRONMENT

(75) Inventors: Nadeem Mirza, Austin, TX (US); Jun Hao, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 262 days.

(21) Appl. No.: 09/970,601

(22) Filed: Oct. 4, 2001

(51) Int. Cl.$^7$ ............................................... G06F 12/00
(52) U.S. Cl. ..................... 711/151; 710/33; 710/111; 710/309; 710/244; 712/33; 712/34; 712/43; 712/225; 711/169
(58) Field of Search .............................. 710/28, 33, 40, 710/111, 244, 309; 711/151, 158, 169; 712/33, 34, 43, 225, 229, 232, 245

(56) References Cited

U.S. PATENT DOCUMENTS

| | | | |
|---|---|---|---|
| 4,787,033 A | * 11/1988 | Bomba et al. .............. | 710/116 |
| 5,001,652 A | * 3/1991 | Thompson .................. | 345/520 |
| 5,450,551 A | * 9/1995 | Amini et al. ............... | 710/119 |
| 5,987,549 A | * 11/1999 | Hagersten et al. .......... | 710/107 |
| 5,990,739 A | * 11/1999 | Lam ........................... | 330/251 |
| 6,014,729 A |   1/2000 | Lannan et al. .............. | 711/150 |
| 6,023,748 A |   2/2000 | Peters et al. ................ | 711/151 |
| 6,032,232 A |   2/2000 | Lindeborg et al. .......... | 711/149 |
| 6,253,270 B1 | * 6/2001 | Ajanovic et al. ........... | 710/107 |
| 6,330,646 B1 | * 12/2001 | Clohset et al. ............. | 711/158 |
| 2001/0033452 A1 | * 10/2001 | Koganezawa et al. ... | 360/77.02 |

* cited by examiner

Primary Examiner—Donald Sparks
Assistant Examiner—Christian P. Chace
(74) Attorney, Agent, or Firm—Barry S. Newberger; Winstead Sechrest & Minick P.C.; Steven Lin (57) ABSTRACT

A multiprocessor digital amplifier system is disclosed. A first processor is configured to decode a digital signal from a digital signal source. A second processor configured to provide control signals to the first processor. An expansion unit for communicating instructions and data between the processors and a memory device has a first port coupled to the first processor and a second port coupled to the second processor. The expansion unit includes a state generator with circuitry for selecting one of the first and second ports for receiving a memory device access grant. The first and second ports may be granted access in accordance with a selected arbitration protocol. A duration of the memory device access grant selectably constitutes one of a preselected number of accesses and a preselected timeslice. An amplifier amplifies the decoded digital signal from the first processor.

22 Claims, 5 Drawing Sheets

SYSTEMS AND METHODS FOR MULTIPORT MEMORY ACCESS IN A MULTIMASTER ENVIRONMENT

BACKGROUND OF THE INVENTION

1. Field of the Invention

The present invention relates in general to data processing systems, and in particular, to data processing systems including multiple bus masters accessing common memory resources.

2. Description of the Related Art

Modern signal processing systems, such as those found, for example, in commercial and consumer audio and multimedia products, are moving, with improvements in Very Large Scale Integration (VLSI) fabrication processes, to "system on a chip" (SoC) implementations. Such implementations may include, as will be discussed further hereinbelow in conjunction with FIG. 1, one or more processors which may perform signal processing and control functions, on-chip memory, and signal amplification whereby an amplified signal may be delivered directly to the user's listening device, a speaker or a headphone set, for example.

As the sources of digital audio, video and multimedia data have become more sophisticated, the tasks required of the play back systems have correspondingly become more complex. For example, the source stream may be delivered in a compressed format in accordance with one or more standardized compression formats, such as those promulgated by the Motion Picture Experts Group (MPEG). Additionally, the compressed digital audio data may be embedded in a multiplexed bitstream that includes additional data, for example, conditional access information which may be used to limit the access to the underlying content to users who have subscribed thereto. Consequently, the digital signal processing demands placed upon the SoC may be significant. Thus, such an SoC may incorporate a DSP engine to perform the computationally intensive signal processing required to extract and recover the uncompressed digital data. Additionally, an SoC may include a general purpose microprocessor ($\mu$P) to provide control functionality (such as user input/output, for example, from a keypad or keyboard, or information display on an LCD device). Additionally, the SoC may include a memory controller for accessing an on-chip memory, or, alternatively, a combination of on-chip and off-chip memory, for storing processor instructions and data. The memory resources may be shared by the DSP engine and the microprocessor, creating potential memory resource contentions.

Consequently, there is a need in the art for systems and methods for shared memory access in a multimaster environment, and in particular a need for mechanisms to arbitrate between masters contending for the shared memory which admits switching between masters without losing data between transactions. Additionally, there is a need for an arbitration mechanism that mitgates against starvation of lower priority masters by a master having a predetermined higher priority.

SUMMARY OF THE INVENTION

According to the principles of the present invention, an amplifier system is disclosed. The system includes a first processor configured to decode a digital signal from a digital signal source, and a second processor configured to provide control signals to the first processor. A memory controller is configured to for communicating instructions and data between a memory device and the first and second processors. An expansion unit has a first port coupled to the first processor and a second port coupled to the second processor. The expansion unit includes a state generator with circuitry for selecting one of the first and second ports for receiving a memory device access grant in response to at least one request from a corresponding one of the first and second processor. The circuitry for selecting one of the first and second ports further contains circuitry for selecting the one of the first and second ports according to a selected arbitration protocol. A duration of the memory device access grant comprises one of a preselected number of accesses and a preselected timeslice The system also includes logic for selecting the one of the preselected number of accesses and the preselected timeslice for determining the duration of the memory device access grant. An amplifier is provided for amplifying a decoded digital signal from the first processor.

The inventive concept addresses a problem in multi-processor amplifier systems, namely access to common memory resources storing processor instructions and memory while mitigating the breaking of the data pipelines while switching between bus masters. Typical arbitration schemes designate a priority master, which can result in bus hogging, whereby bus masters having lower priority may be starved. In accordance with the present inventive principles, an access grant is allocated a duration selectably having a preselected timeslice or a preselected number of memory device accesses.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth such as specific time slices, etc. to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details concerning time and considerations and the like have been omitted inasmuch as such details are not necessary to obtain a complete understanding of the present invention and are within the skills of persons or ordinary skill in the relevant art. Furthermore, in describing an embodiment of the invention, the terms "assert" and "negate" and various grammatical forms thereof, may be used to avoid confusion when dealing with the mixture of "active high" and "active low" logic signals. "Assert" is used to refer to the rendering of a logic signal or register bit into its active, or logically true, state. "Negate" is used to refer to the rendering of a logic signal or register bit into its inactive, or logically false, state.

Refer now to the drawings wherein depicted elements are not necessarily shown to scale and wherein like or similar elements are designated by the same reference numeral through the several views.

Figure 1:
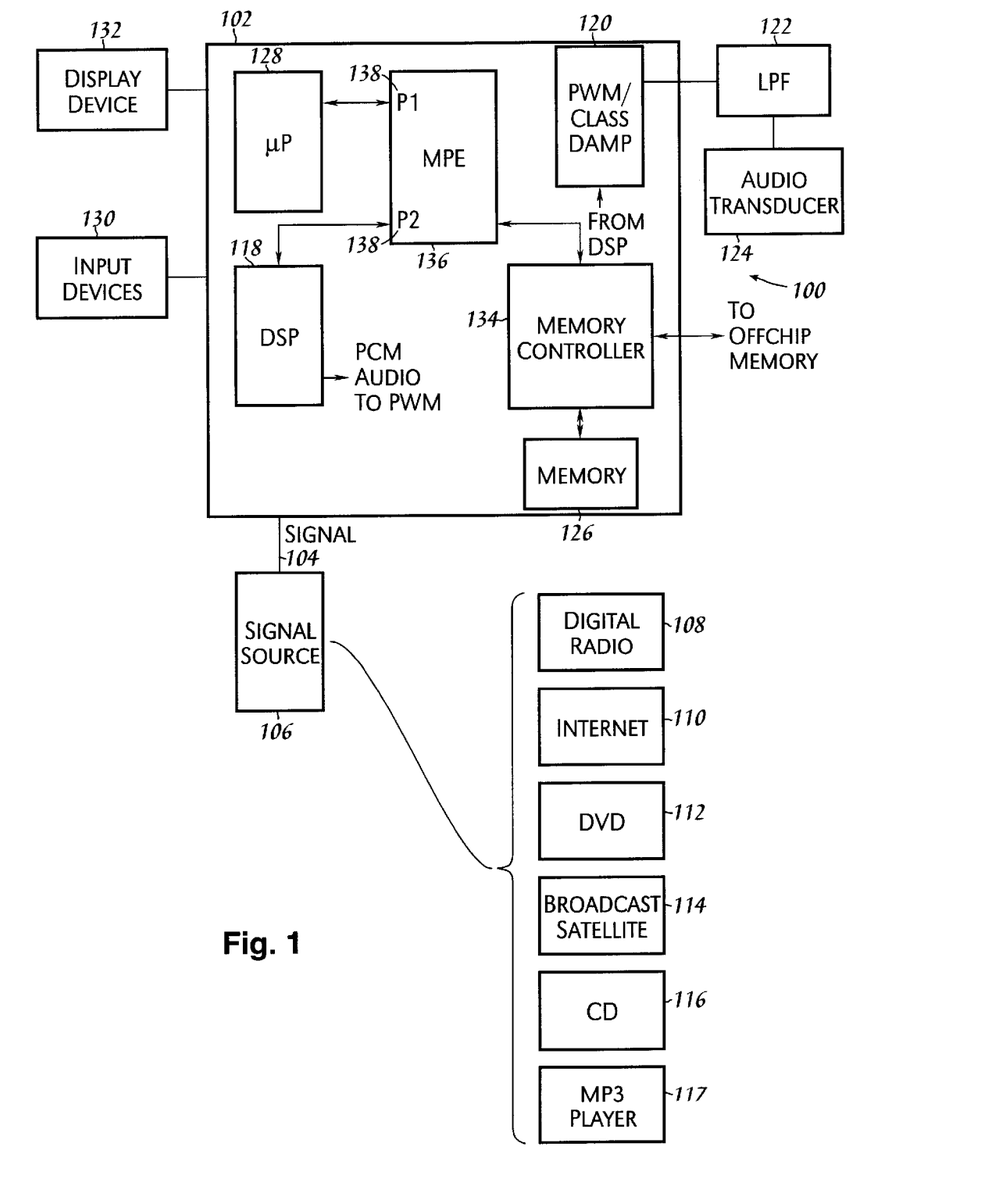
FIG. 1 illustrates, in block diagram form an audio system in accordance with an embodiment of the present invention.

FIG. 1 illustrates a digital audio system 100 incorporating the principles of the present invention. System 100 includes system-on-a-chip (SoC) 102. SoC 102 receives digital signal 104 from a signal source 106, which may include one or more of, for example, a digital radio 108, an Internet audio or multimedia stream 110, a digital video disk (DVD) player 112, direct broadcast satellite (TV/radio) 114, audio compact disk (CD) player 116 and MP3 player 117. (As would be appreciated by those of ordinary skill in the art MP3 refers to Motion Picture Experts Group (MPEG)—I Audio layer 3 compressed audio format.) Digital signal 104 may be a conventional pulse code modulated (PCM) digital representation of an audio signal, or may represent a more complex digital content stream, for example, an MPEG Transport Stream, which may include multiplexed content streams in compressed, digitized form (referred to as packetized elementary streams (PES)) along with, optionally, conditional access packets that contain information necessary to decrypt content that is directed to paid subscribers thereof.

Digital signal processing (DSP) engine 118 processes signal stream 104. DSP 118 may, for example, depending on the format of the signal stream provided by signal source 106, may decompress, decrypt, and demultiplex the digital signal, as well as perform other signal processing, for example, filtering, of the signal, and provides a processed PCM audio signal to pulse width modulator (PWM)/class D amplifier 120. PWM/class D amplifier 120 provides a digital to analog conversion, generating an amplified audio signal. The output analog signal is filtered via a low pass filter (LPF 122) and provided to audio transducer 124, for example a speaker or headset, for presentation to the user.

Instructions and data for DSP 118 may be included in on-chip memory 126 or a combination of on-chip memory 126 and off-chip memory (not shown in FIG. 1).

SoC 102 also includes microprocessor ($\mu$P) 128. Microprocessor 128 may perform input/output (I/O) and control functions and other tasks which do not require the capabilities of a DSP engine associated with computationally intensive signal processing. Microprocessor 128 may handle communication with peripheral devices, process interrupts, and read and write control information to and from memory. For example, microprocessor 128 may process signals received from user input devices 130. Such user input devices may, for example, provide signals for selecting particular content to be output by SoC 102 from a multiplexed transport stream via signal 104. Additionally, microprocessor 128 may, in response thereto, generate output signals for display on display device 132, which may for example, be a liquid crystal display (LCD). Displayed information may include information with respect to the signal source such as a title, track number etc. I/O devices may be interfaced with microprocessor 128 via a peripheral bus 133 and bridge 135. Bridge 135 mediates I/O transactions between microprocessor 128 residing on bus 140 and peripheral bus 133, which may, typically, have a slower speed that bus 140. Bridge 135 may thus be a slave device with respect to bus 140.

Instructions and data for microprocessor 128 may be contained in on-chip memory 126 and, optionally, off-chip memory (not shown in FIG. 1). Note that memory 126 and off-chip memory, if any, may constitute a memory space that is shared by microprocessor 128 and DSP 118. For example, data for the control of DSP 118, in response to user input, may be generated by microprocessor 128 and stored in memory 126 or off-chip memory, if any. Thus, a change in signal source initiated by user input and processed by microprocessor 128 may implicate a different set of signal processing tasks to be performed by DSP 118. In response, microprocessor 128 may generate an interrupt for DSP 118 by writing to a corresponding register in a shared memory space.

Memory 126, and any off-chip memory are accessed via memory controller 134. Memory Controller 134 may be a static memory controller, or alternatively a synchronous dynamic random access memory (SDRAM) memory controller, depending on the type of memory implemented for memory 126 and any off-chip memory. Additionally, memory controller 134 may include a portion configured to control SDRAM and another portion configured to control SRAM. Memory transactions by microprocessor 128 and DSP 118 are mediated by multiport expansion unit 136, in accordance with the principles of the present invention to be discussed hereinbelow. Microprocessor 128 and DSP 118 are coupled to multiport expansion unit 136 via corresponding one of ports 138 (labeled P1 and P2, respectively). Data and address signals may be communicated between microprocessor 128 and P1, and between DSP 118 and P2 via internal bus 140, which may be a pipelined bus. A pipelined bus architecture which may be used in conjunction with the present invention is the Advanced Microprocessor Bus Architecture (AMBA) Advanced High-performance Bus (AHB). (AMBA™ AHB is an open bus architecture promulgated by ARM Ltd., and is defined in the AMBA™ Specification (Rev. 2.0), 1999, which is hereby incorporated herein by reference.) The structure and operation of multiport expansion unit 136, in accordance with the principles of the present invention, will now be discussed in conjunction with FIGS. 2–5.

Figure 2:
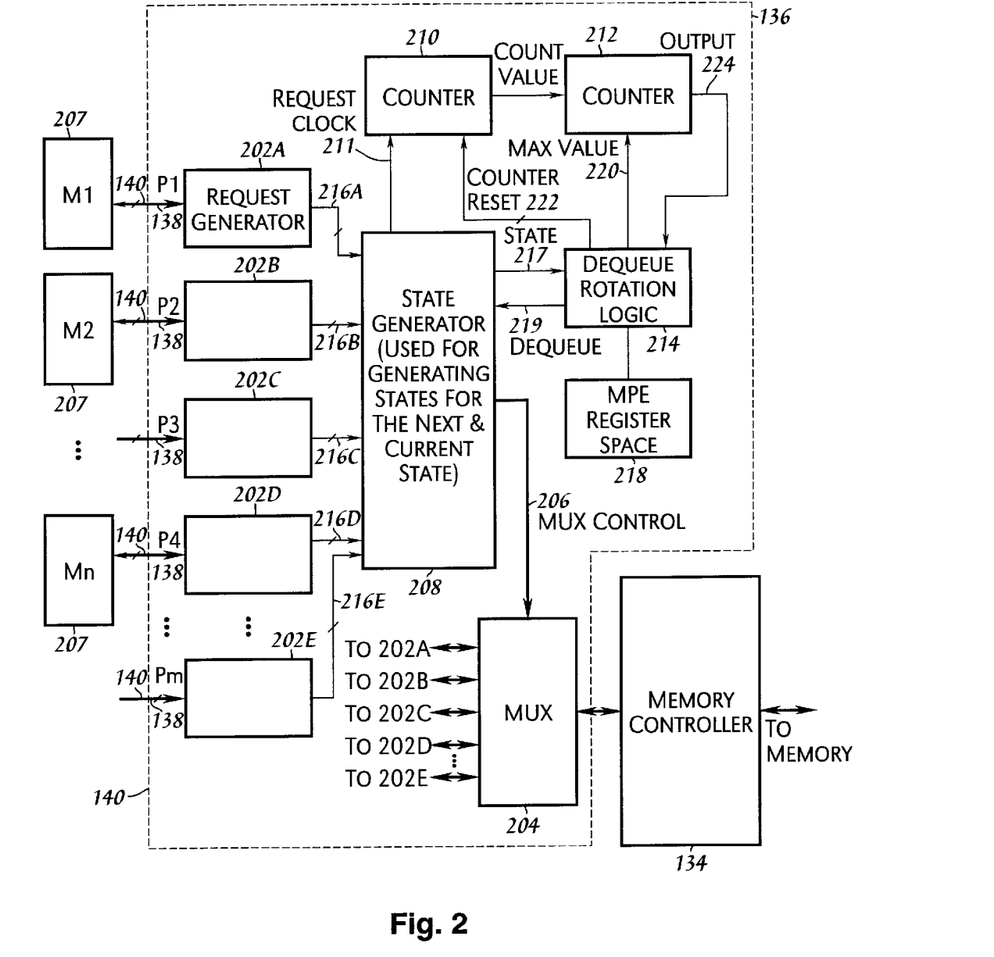
FIG. 2 illustrates, in block diagram form, a multi port expansion unit in accordance with an embodiment of the present invention.

Referring first to FIG. 2, there is illustrated therein, in block diagram form, an embodiment of a multiport expansion unit, such as multiport expansion unit 136, FIG. 1, in accordance with the present inventive principles. Multiport expansion unit 136 includes a plurality of request generators 202A–202E. A number, n, of request generators may be included. Each of request generators 202A–202E includes a corresponding one of ports 138 which interface the request generator to a bus master via internal bus 140, which ports are denoted P1, P2, P3, P4 and Pm. Each bus master 204 is coupled to one of ports P1, P2, P3, etc. A plurality, n of bus masters may be coupled to multiport expansion unit 136. It would be appreciated by those of ordinary skill in the art, that in general, the number of bus masters, n, may be less than the number m, of ports 138. In other words, not every port of multiport expansion unit 136 need to be occupied in a particular embodiment of a multiport expansion unit in accordance with the principles of the present invention. Referring again to FIG. 1, each of microprocessor 128 and DSP 118 may be a bus master in an embodiment of an SoC 102 in accordance with the present invention.

Request generators 202A–202E mediate memory transaction requests between the corresponding master coupled to the request generator's associated port and memory. Data and addresses are communicated from the bus master requesting the bus transaction on bus 140 to the corresponding request generator. Likewise, read data returned from memory is passed through the request generator to the master requesting the data. Note that bus 140 may include a shared portion, for example, address and data lines and an unshared portion, for example, control signal lines which are unique to each port 138 and concomitantly, the corresponding one of request generators 202A–202E. In an embodiment of the present invention, the data and address portions of bus 140 may each be thirty-two bits wide, however, in an alternative embodiment, other bus widths may be used in conjunction with the principles of the present invention, and such embodiments would fall within the spirit and scope of this present invention. Data and address signals are communicated to memory controller 134 via multiplexer (MUX) 204. The multiplexing of the data, address, and control signals will be described further in conjunction with FIG. 4.

MUX 204 selects for data address and control signals from the corresponding one of request generators 202A–202E coupled to the respective inputs thereof in response to MUX control 206 generated by state generator 208. Bus requests from bus masters 207 are received by the corresponding request generator. In response, the request generator asserts a request on a respective one of request/grant controls 216A–216E. State generator 208, in conjunction with counter 210, comparator 212 and dequeue rotation logic 214 effects the arbitration of bus requests from the bus masters.

Figure 3:
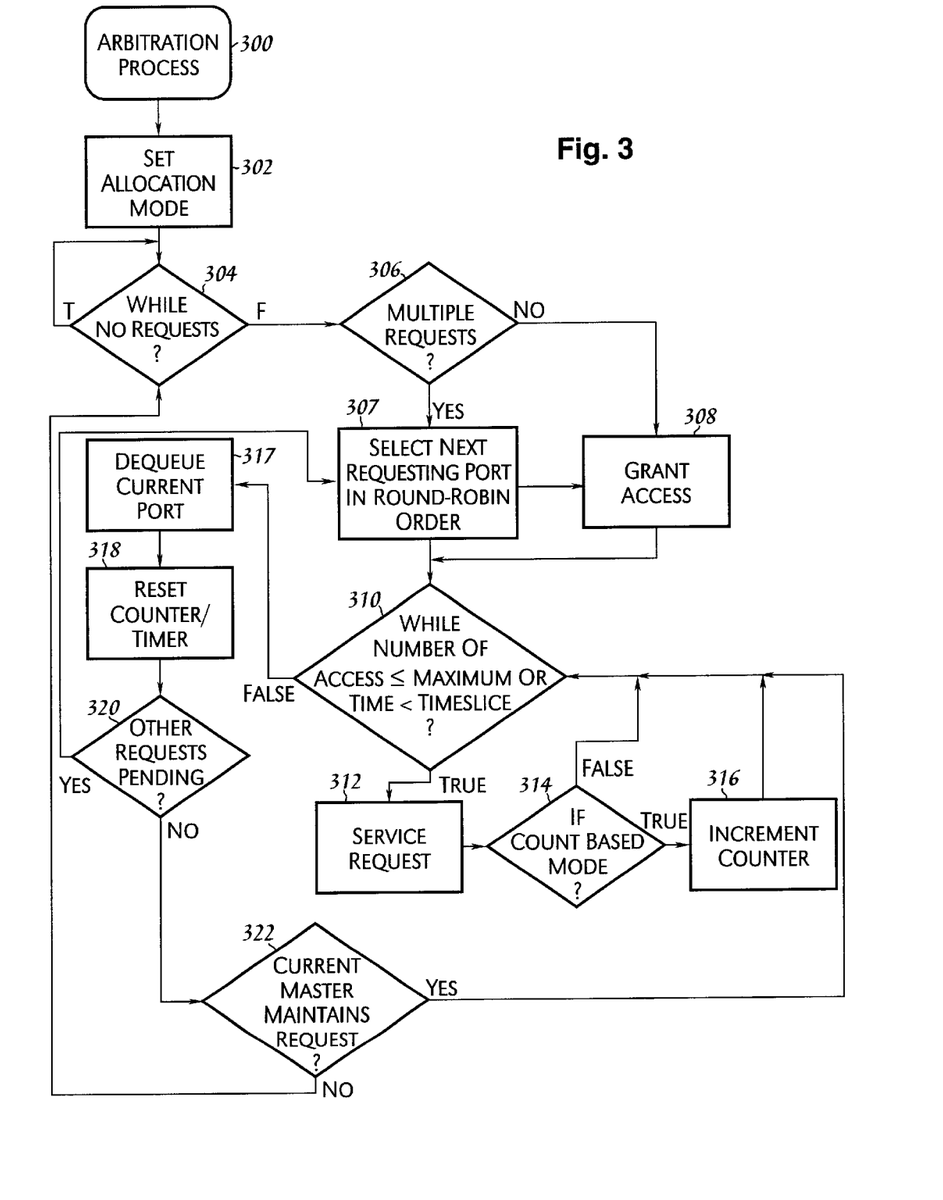
FIG. 3 illustrates, in flowchart form, an arbitration methodology in accordance with the present invention.

Refer now to FIG. 3 illustrating, in flowchart form, an arbitration process 300 in accordance with the principles of the present invention which may be performed by state generator 208, in conjunction with counter 210, comparator 212 and dequeue rotation logic 214. (Note that the flowcharts provided herein are not necessarily indicative of the serialization of operations being performed in an embodiment of the present invention. Many of the steps disclosed within these flowcharts may be performed in parallel. The flowcharts are meant to designate those considerations must be performed to execute the arbitration of bus requests.)

In accordance with the present inventive principles, bus resources may be allocated to a requesting bus master in accordance with a selectable allocation mode. In a first mode, bus resources may be allocated to a requesting bus master on a temporal basis. That is, each bus master may be allocated a timeslice during which it may request memory accesses. In a second selectable allocation mode, each bus master may be granted bus resources on an access count basis. In other words, each bus master may be entitled to a predetermined number of access requests. (An access request may generically refer to either a read request or a write request.) In step 302, the allocation mode, which may be one of the temporal-based or access count-based modes is set. In accordance with an embodiment of multiport expansion unit 136, a value may be set in a register in MPE register space 218, which value is operable for selecting the allocation mode. For example, a first value, corresponding to the first, temporal, mode discussed hereinabove, may be selected by holding a first logic level on an external pin of an SoC in accordance with the embodiment of the present invention, such as SoC 102 FIG. 1, during reset of the device (either at power-up, or in response to an event that generates a device reset, such as the expiration of a watchdog timer (not shown in FIG. 1). It would be appreciated by those of ordinary skill in the art that other techniques may be used to set a value for selecting the allocation mode, for example, during the programming of the device memory, for example, memory 126, FIG. 1 via a serial interface or other such circuitry for providing programming instructions for the on-chip processors, such as microprocessor 128 and DSP 118 in SoC 102. In an embodiment in accordance with MPE unit 136, FIG. 2, circuitry for selecting the allocation mode may be included in dequeue rotation logic 214.

Additionally, in an embodiment of the present invention, a timeslice, for the temporal-based mode, or a maximum count, for the count-based mode, may be set for each master in a register in MPE register space 218. That is, a timeslice value or maximum count value may be assigned to a port associated with a master, and each port may have a different timeslice value or maximum count value. In this way, bus masters having different bus transaction speeds may be accommodated.

Referring again to FIG. 3, in step 304, process 300 idles pending receipt of a bus grant request from at least one bus master. On receipt of a bus request, step 304 breaks out of the idle loop, and in step 306, it is determined if multiple grant requests have been asserted. If multiple requests have been asserted, in step 307 a next requesting port is selected for accessing the bus in accordance with a circular first-in-first-out (FIFO) protocol (which may also be referred to as a round robin protocol), and in step 308 access is granted. Conversely, if only a single grant request has been asserted, step 307 is bypassed. Note that while a corresponding bus master has an unserviced request pending, the associated request generator may hold a bus master grant signal in its negated state.

In step 310, while a number of access requests is less than a maximum count value, or access time is less than a predetermined timeslice value and the memory transaction is not completed, in accordance with the allocation mode set in step 302, an access request is serviced in step 312. Recall, as discussed hereinabove, an access request may be either a read access or a write access. In step 314, if the count-based mode has been selected in step 302, a counter, such as counter 210, FIG. 2, is incremented, step 316. In an embodiment of an MPE unit in accordance with FIG. 2, the counter may be incremented in response to request clock 211. Request clock 211 may be provided by a signal asserted on completion of a transfer. For example, in an embodiment implemented in accordance with the AMBA™ AHB architecture, request clock 211 may be provided by HREADY, as defined in the AMBA™ Specification. Process 300 then returns to step 310. If, however, in step 314 a temporal-based mode has been set, step 316 is bypassed.

Process 300 loops over steps 310–316 while the number of accesses (in an access count based-mode) is less than a maximum count for the bus master having the current access grant, or the access time (for a temporal-based allocation mode) is less than the allocated time slice for the current bus master. In an embodiment of the present invention, state 217 may communicate the port corresponding to the current bus master to dequeue rotation logic 214, FIG. 2, and, in the count-based mode. A maximum count value for that master may be read from MPE register space 218. The maximum count value (max value 220) may be input to comparator 212. (In a temporal-based mode, timer/interrupts logic in state generator 208, not shown in FIG. 2, may be used, as discussed below in conjunction with FIG. 4.) On the expiration of the maximum count allocation or, or alternatively, timeslice, process 300 breaks out of the loop via the "False" path. Comparator 212 may assert output 724 when the current count reaches the maximum count value (max value 220). In step 317, it is determined if other requests are pending. If so, process 300 returns to step 307 and selects the next requesting port in round robin order, as previously described. Otherwise, if no other requests are pending, in step 318, the current port is dequeued. This may be performed in response to an assertion of dequeue 219 (FIG. 2) which may be asserted on expiration of the maximum count or timeslice, depending, alternatively, on the mode set in step 302. Additionally, the corresponding request generator may negate a grant signal. In step 320, the counters or, alternatively, timers are reset, depending on the mode selected in step 302. In an embodiment of a multiprocess expansion unit in accordance with FIG. 2, counter 210 may be reset in accordance with step 320 by dequeue rotation logic 214 via counter reset 222.

In step 322 it is determined if the current master maintains an access grant request. If so, process 300 returns to step 310, and services the request adds previously described in conjunction with steps 310–316. If the current master has not maintained the grant request, process 300 returns to step 304, and idles pending receipt of a grant request.

Figure 4:
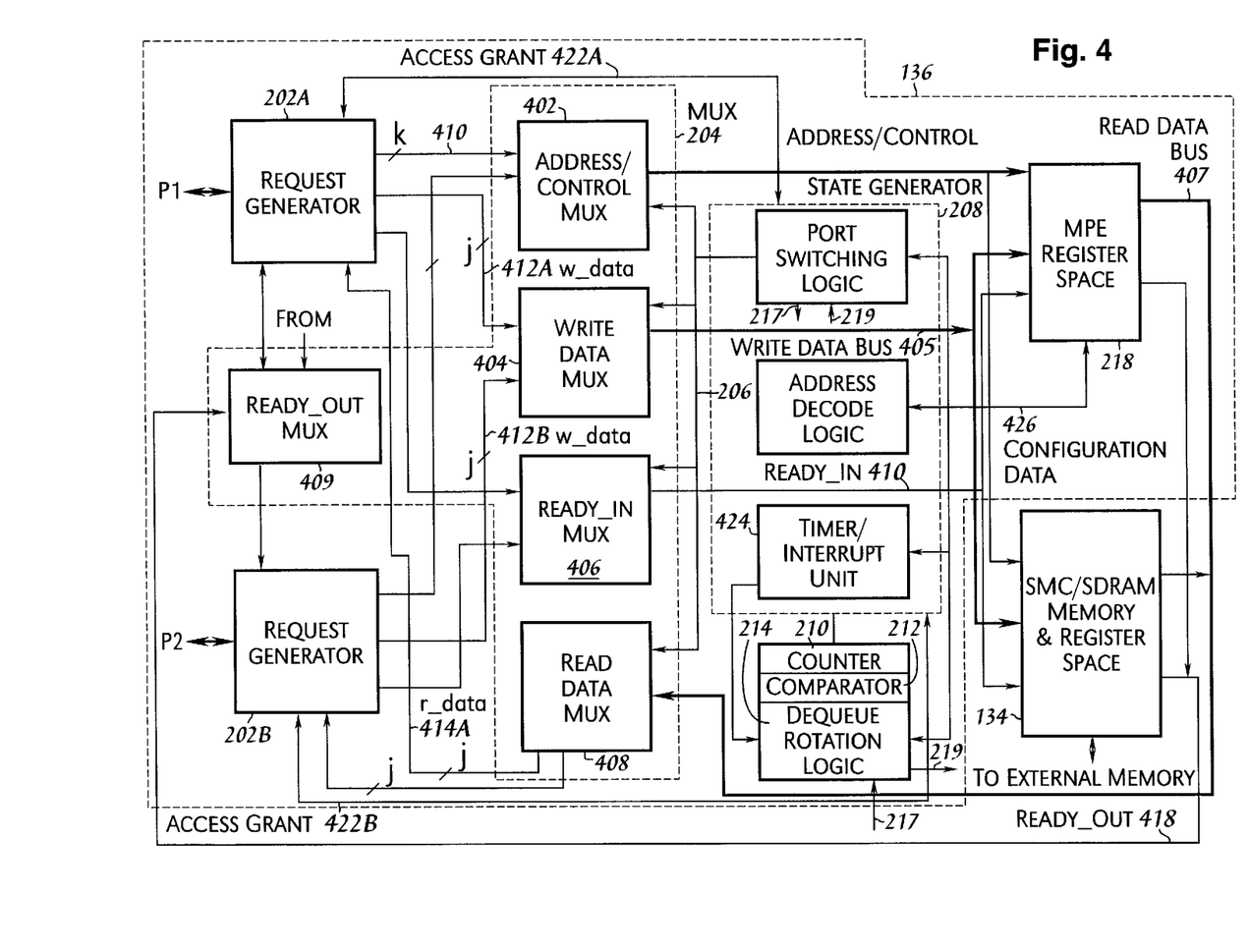
FIG. 4 illustrates, in block diagram form, portions of the memory expansion unit of FIG. 2 in further detail.

Referring now to FIG. 4, there is illustrated therein an embodiment of multiport expansion unit 136 in additional detail. Note that in FIG. 4, two request generators, request generator 202A and 202B are shown, however, it would be understood by those of ordinary skill in the art that request generators 202C–202F may be included in an embodiment of the present invention as request generators 202A and 202B in the same fashion as shown in FIG. 4. As described hereinabove in conjunction with FIG. 2, data, which may include read and write data, addresses and control signals, are communicated between the memory controller and the active port, that is the port coupled to the master currently granted access to the memory resources which may include MPE register space 218, memory controller register space 401, internal memory 126 and external, or off-chip, memory (not shown in FIG. 4). MPE register space 218 and memory controller register space 401 may include configuration information for multiport expansion unit 136 and memory controller 134, respectively.

In accordance with the embodiment of multiprocessor expansion unit 136 in FIG. 4, MUX 204 includes address/control MUX 402, write data MUX 404, ready_in MUX 406, read data MUX 408 and ready_out MUX 409. MUX 402 may, in general, be an m-to-one MUX (however, in FIG. 4 appears as a two-to-one MUX inasmuch as request generators 202C–202F have not been shown). Additionally, an embodiment in which there are k address and control lines, MUX 402 may be a k-way MUX. Address decode logic 411 decodes addresses on address/control lines 410, and selects the corresponding memory resource for the requested memory transaction (read/write) in response thereto. For example, in an embodiment in which the memory bus is implemented in accordance with the AMBA™ AHB architecture, the address portion of the k address/control lines 410 may be thirty-two bits wide. Additionally, in an AMBA™ AHB implementation, address/control lines 410 may include, for example, a bus clock, transfer type bits (e.g. sequential or nonsequential), transfer direction bits, transfer size bits, burst type bits and protection control bits. Note that in an embodiment of multiport expansion unit 136 implemented in accordance with the AMBA™ AHB, a particular embodiment may not use all of the aforementioned control signals, and, conversely, alternative implementations may include control signals in addition to the aforementioned, and such embodiments would be understood by those of ordinary skill in the art to fall within the spirit and scope of the present invention. Moreover, a multiport expansion unit 136 in accordance with the present inventive principles need not necessarily use the AMBA™ AHB architecture, and alternative embodiments implemented in accordance with other bus architectures would also be understood to fall within the spirit and scope of the present invention.

Similarly, write data MUX 404 may be a m-to-one MUX (although shown in FIG. 4, for illustrative purposes, as a two-to-one MUX, inasmuch as ports P3–Pm and corresponding request generators are not shown in FIG. 4). Write data (w_data 412A and w_data 412B) may, in general, be j bits wide and are multiplexed onto write data bus 405. In such an embodiment, one of ordinary skill would recognize that write data MUX 404 may be a j-way MUX, that is, contain logic to select the j bits in response to MUX select 206. In an implementation in accordance with the AMBA™ AHB specification, j may be thirty-two bits. However, other embodiments of multiport expansion unit 136 incorporating the present inventive principles may be implemented with other write data widths, and these would fall within the spirit and scope of the present invention.

MUX 406 may be an m-to-one MUX (illustrated with two inputs shown in FIG. 4). MUX 406 selects a ready_in signal from the active bus master, that is, the bus master having access to the memory resource. As discussed hereinabove in conjunction with FIG. 1, a bus transaction by a bus master may need not be targeted to a memory resource. Other slave devices may be targeted, for example a bus bridge mediating I/O transactions via a peripheral bus. A ready_in signal, such as ready_in 416, may be asserted by a bus master wherein, in response, slave devices, including MPE expansion unit 136, may decode at least a portion of the transaction address, which may serve as a select signal for the target device. The targeted device may then response to the transaction, which may be ignored by the other slave devices. Thus, MPE expansion unit 136 may respond to a memory read/write transaction between a bus master and one of internal memory (MPE register space 218, memory controller register space 411 and memory 126) and external memory (not shown in FIG. 4.) The output of ready_in MUX 406, ready_in 416, is provided to MPE register space 218 and memory controller 134.

Read data MUX 408 multiplexes data read from a memory resource via read data bus 407 to one of ports P1–Pm (of which only ports P1 and P2 are shown in FIG. 4) via a corresponding request generator. In general, read data MUX 408 is a one-to-m-Mux (although illustrated as a one-to-two MUX inasmuch as ports P3–Pm are not shown in FIG. 4). Read data (for example, r_data 414A and r_data 414B) may be j bits wide. Similar to w_data 412A–412B in an embodiment in accordance with AMBA™ AHB, j may be thirty-two bits.

Similarly, ready_out MUX 409 may be a one-to-m MUX (of which two outputs, to request generator 202A and request generator 202B, respectively are shown in FIG. 4). Ready_out MUX 409 selectively outputs ready_out signal 418 to one of ports P1–Pm via a corresponding one of request generators 202A–202F (request generators 202A–202F and ports P3–Pm are not shown in FIG. 4). In an embodiment of the present invention in which the memory bus is pipelined, ready_out 418 may be used to insert wait states in a memory read transaction. In a pipelined bus architecture, addresses and data may overlap. That is, the address phase of a transfer may occur during the data phase of the previous transfer. This may be further understood by referring now to FIG. 5 which illustrates exemplary timing diagrams of a pipelined bus, including the insertion of wait states via a ready_out signal, such as ready_out 418 in FIG. 4. In the embodiment of a pipelined bus architecture in FIG. 5, it is assumed that addresses and data latch on the rising edge of bus clock 502 however, in an alternative embodiment, latching on the falling edge may be used. Address signals 504 and data signals 506 show the pipelining of addresses and data without wait states. Note that the data, D1 at address A1 overlaps the assertion of the next address, A2. Similarly, the data, D2, at address A2 overlaps the next address, A3, and so forth.

Figure 5:
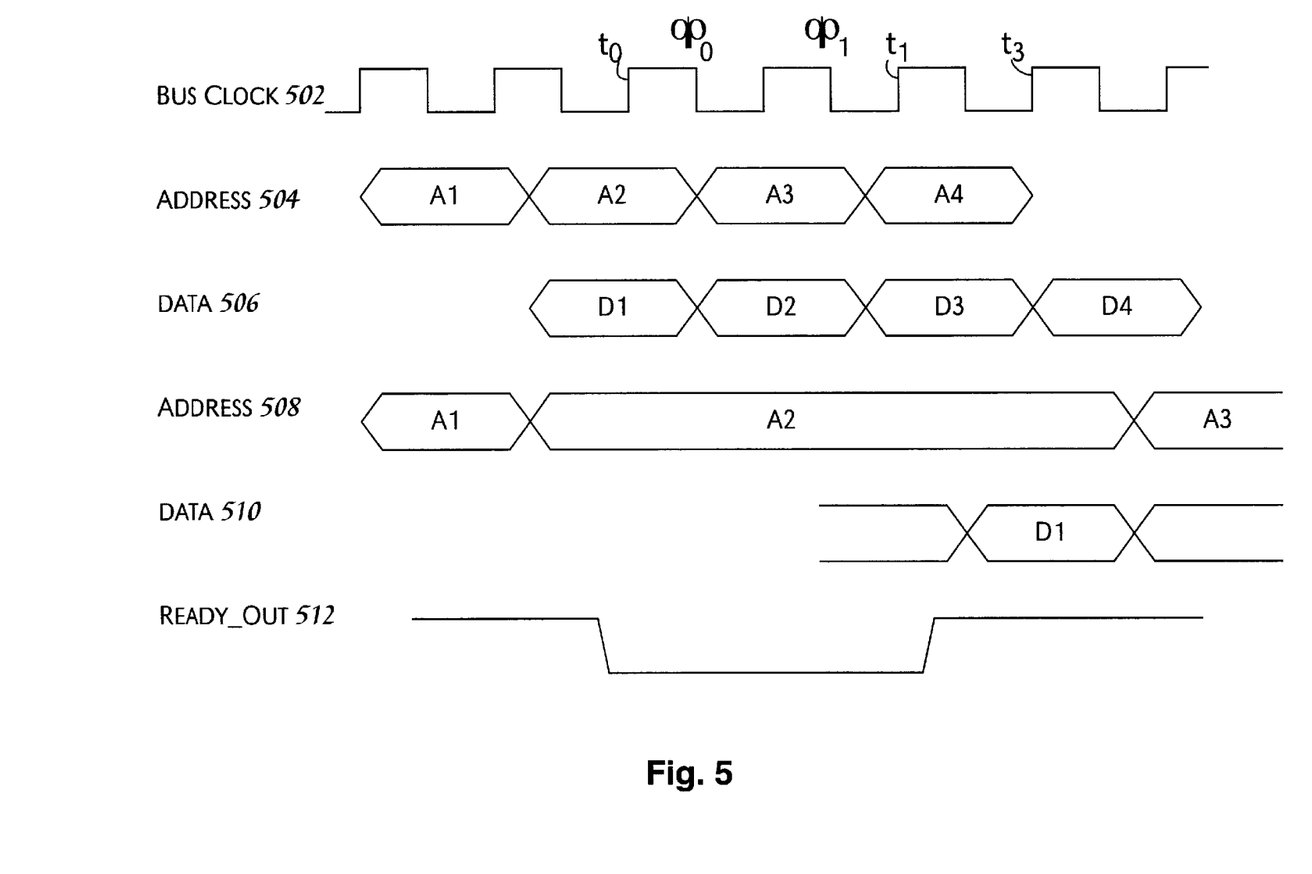
FIG. 5 illustrates a timing diagram associated with a pipelined memory bus architecture.

To accommodate a latency in the return of read data from a memory resource, such as MPE register space 218, or memory controller 134 coupled to external memory (not shown in FIG. 4) wait states may be inserted by the memory resource by negating the ready_out signal. In FIG. 5, ready_out 512 is negated prior to edge $t_0$ of bus clock 502. Prior to edge $t_1$ of bus clock 502 the memory resource reasserts ready_out 512. Subsequent to edge $t_1$, the write data 510 at address A1, D1, becomes valid. And the data is latched at edge $t_3$ of bus clock 502. In this way, the memory resource inserts wait states spanning two periods,$\phi_0$ and$\phi_1$ of bus clock 502. As shown in address signal 508, the current bus master, coupled to the corresponding one of ports P1 and P2 in FIG. 4, holds the overlapped address, A2 over the wait state. Address A2 is latched at edge $t_3$ of bus clock 502.

Returning to FIG. 4, MUX's 402, 404, 406, 408 and 409 select for one of request generators 202A–202F (202A and 202B shown in FIG. 4) in response to MUX control 206. MUX control 206 is output by port switching logic 420 in state generator 208. Port switching logic 420 may generate MUX control 206 in accordance with arbitration process 300, FIG. 3. In particular, port switching logic 420 selects a port, and switches the multiplexers, and asserts access grant signals 422A and 422B in accordance with the round robin protocol (step 307, FIG. 3). In response, the corresponding request generator may assert a bus master grant signal. (In an embodiment in accordance with the AMBA™ Specification, such a grant signal may be denoted HGRANTx.) Additionally, dequeue rotation logic 214 in conjunction with counter 210 and comparator 212 (for the access count-based mode) or timer/interrupt 424 (temporal-based mode) may effect the rotation of bus masters (including steps 310, 314–318, FIG. 3) in conjunction with configuration data 426 loaded in MPE register space 218. The operation of dequeue logic, counter 210 and comparator 212 in count-based mode have been described hereinabove. In the temporal-based mode, a timeslice value may be received via configuration data 426 from MPE register space 218. On expiration of the timeslice, timer/interrupt unit 424 may assert interrupt 428, and in response dequeue logic 214 may assert dequeue 219. (Timing in timer/interrupt unit 424 may be in units of the bus clock (not shown in FIG. 4.)) In response, port switching logic 420 may negate the one of access grant 422A–B corresponding to the current port and assert the access grant corresponding to the next port in the round robin order having a bus grant request. The corresponding port may then negate a grant signal from the corresponding master.

Although the present invention and its advantages have been described in detail, it should be understood that various changes, substitutions and alterations can be made herein without departing from the spirit and scope of the invention as defined by the appended claims.

What is claimed is:

1. A system comprising:
    a first processor configured to decode a digital signal from a digital signal source;
    a second processor configured to provide control signals to the first processor; and
    an expansion unit having a first port coupled to the first processor and a second port coupled to the second processor wherein the expansion unit is configured to communicate data and instructions between a memory device and the first and second processors, the expansion unit including:
        a state generator comprising circuitry for selecting one of the first and second ports for receiving a memory device access grant in response to at least one request from a corresponding one of the first and second processor, the circuitry including circuitry for selecting the one of the first and second ports according to a selected arbitration protocol, and wherein a duration of the memory device access grant comprises one of a preselected number of accesses and a preselected timeslice; and
        logic for selecting the one of the preselected number of accesses and the preselected timeslice for determining the duration of the memory device access grant, and
    an amplifier for amplifying a decoded digital signal from the first processor.

2. The system of claim 1 wherein the at least one request from the corresponding one of the first and second processor comprises a first request of a plurality of requests, wherein the memory device access grant comprises a first access grant in response to the first request, the one of the preselected number of accesses and the preselected timeslice comprising one of a preselected first number of accesses and a preselected first timeslice, and wherein a duration of a second access grant in response to a second request of the plurality of requests comprises one of a preselected second number of accesses and a preselected second timeslice, and wherein the one of the preselected second number of accesses and the second timeslice differs from the one of the preselected first number of accesses and the first timeslice.

3. The system of claim 1 further comprising dequeue logic coupled to the state generator for signaling a termination of the memory device access grant, the dequeue logic signaling the termination of the memory device access grant in response to an expiration of the duration of the memory device access grant.

4. The system of claim 1 including timing logic for determining an expiration of the preselected timeslice, and wherein the memory device access grant is negated in response to the expiration of the preselected timeslice.

5. The system of claim 1 further comprising a register space, the register space for storing the one of the preselected number of accesses and the preselected timeslice.

6. The system of claim 5 wherein the one of the pre and the preselected timeslice is loaded in the register space in response to an initialization of the system.

7. The system of claim 3 further comprising:
    a comparator for receiving a current access count and the preselected number of accesses;
    a counter for incrementing a previous access count, the current access count comprising an incremented value of the previous access count, and wherein the dequeue logic signals a termination of the memory device access grant in response to an assertion of an output of the comparator.

8. The system of claim 2 further comprising a register space, the register space for storing the one of the preselected first number of accesses and the preselected first timeslice, and the one of the preselected second number of accesses and the preselected second timeslice.

9. An apparatus comprising:

a plurality of ports each configured for coupling to a bus master; and a state generator comprising circuitry for selecting one of the plurality of ports for receiving an access grant in response to at least one request from a corresponding bus master, the circuitry including circuitry for selecting the one of the plurality of ports according to a selected arbitration protocol, and wherein a duration of the access grant comprises one of a preselected number of accesses and a preselected timeslice; and logic for selecting the one of the preselected number of accesses and the preselected timeslice for determining the duration of the access grant.

10. The apparatus of claim 9 wherein the selected arbitration protocol comprises a round robin protocol.

11. The apparatus of claim 9 further comprising:

a comparator for receiving a current access count and the preselected first number of accesses; and dequeue logic coupled to the state generator for signaling a termination of the access grant, the dequeue logic signaling the termination of the access grant in response to an assertion of an output of the comparator.

12. The apparatus of claim 11 further comprising a counter for incrementing a previous access count, the current access count comprising an incremented value of the previous access count.

13. The apparatus of claim 11 wherein the counter increments the previous access count in response to a request clock.

14. The apparatus of claim 9 further comprising a register space, the register space for storing the one of the preselected number of accesses and the preselected timeslice.

15. The apparatus of claim 14 wherein the one of the preselected number of accesses and the preselected timeslice are loaded in the register space in response to an initialization of the expansion apparatus.

16. The apparatus of claim 9 wherein the at least one request from the corresponding bus master comprises a first request of a plurality of requests, wherein the access grant comprises a first access grant in response to the first request, the one of the preselected number of accesses and the preselected timeslice comprising one of a preselected first number of accesses and a preselected first timeslice, and wherein a duration of a second access grant in response to a second request of the plurality of requests comprises one of a preselected second number of accesses and a preselected second timeslice, and wherein the one of the preselected second number of accesses and the second timeslice differs from the one of the preselected first number of accesses and the first timeslice.

17. The apparatus of claim 9 further including timing logic for determining an expiration of the preselected timeslice, and wherein the access grant is negated in response to the expiration of the preselected timeslice.

18. The apparatus of claim 9 further including a plurality of request generators, each request generator of the plurality of request generators associated with a port of the plurality of ports, the request generator for communicating access requests to the state generator.

19. A method comprising the steps of:

selecting one a first allocation mode and a second allocation mode;

selecting a first bus master in response to a first grant request in accordance with a selected arbitration protocol;

if the first allocation mode is selected, servicing an access request from the first bus master if an access count is less than a first preselected number of accesses; and if the second allocation mode is selected, servicing an access request from the first bus master if an access time is less than a first preselected timeslice.

20. The method of claim 19 further comprising the steps of:

selecting a second bus master in response to a second grant request in accordance with the selected arbitration protocol;

if the first allocation mode is selected, servicing an access request from the second bus master if an access count is less than a second preselected number of accesses; and if the second allocation mode is selected, servicing an access request from the second bus master if an access time is less than a second preselected timeslice.

21. The method of claim 20 further comprising retrieving at least one of the first preselected number of accesses and the first preselected timeslice and at least one of the second preselected number of accesses and the second preselected timeslice from a register space.

22. The method of claim 20 wherein the preselected second number of accesses differs from the preselected first number of accesses and the second timeslice differs from the first timeslice.

* * * * *

UNITED STATES PATENT AND TRADEMARK OFFICE
CERTIFICATE OF CORRECTION

PATENT NO. : 6,715,042 B1  Page 1 of 1
DATED : March 30, 2004
INVENTOR(S) : Nadeem Mirza and Jun Hao It is certified that error appears in the above-identified patent and that said Letters Patent is hereby corrected as shown below:

Column 10,
Line 51, please delete "pre" and insert -- preselected number of accesses and --

Signed and Sealed this

Tenth Day of August, 2004

JON W. DUDAS
*Acting Director of the United States Patent and Trademark Office*